Oct. 22, 1963 L. W. MORGAN 3,108,094
OLEFIN POLYMERIZATION
Filed May 18, 1959
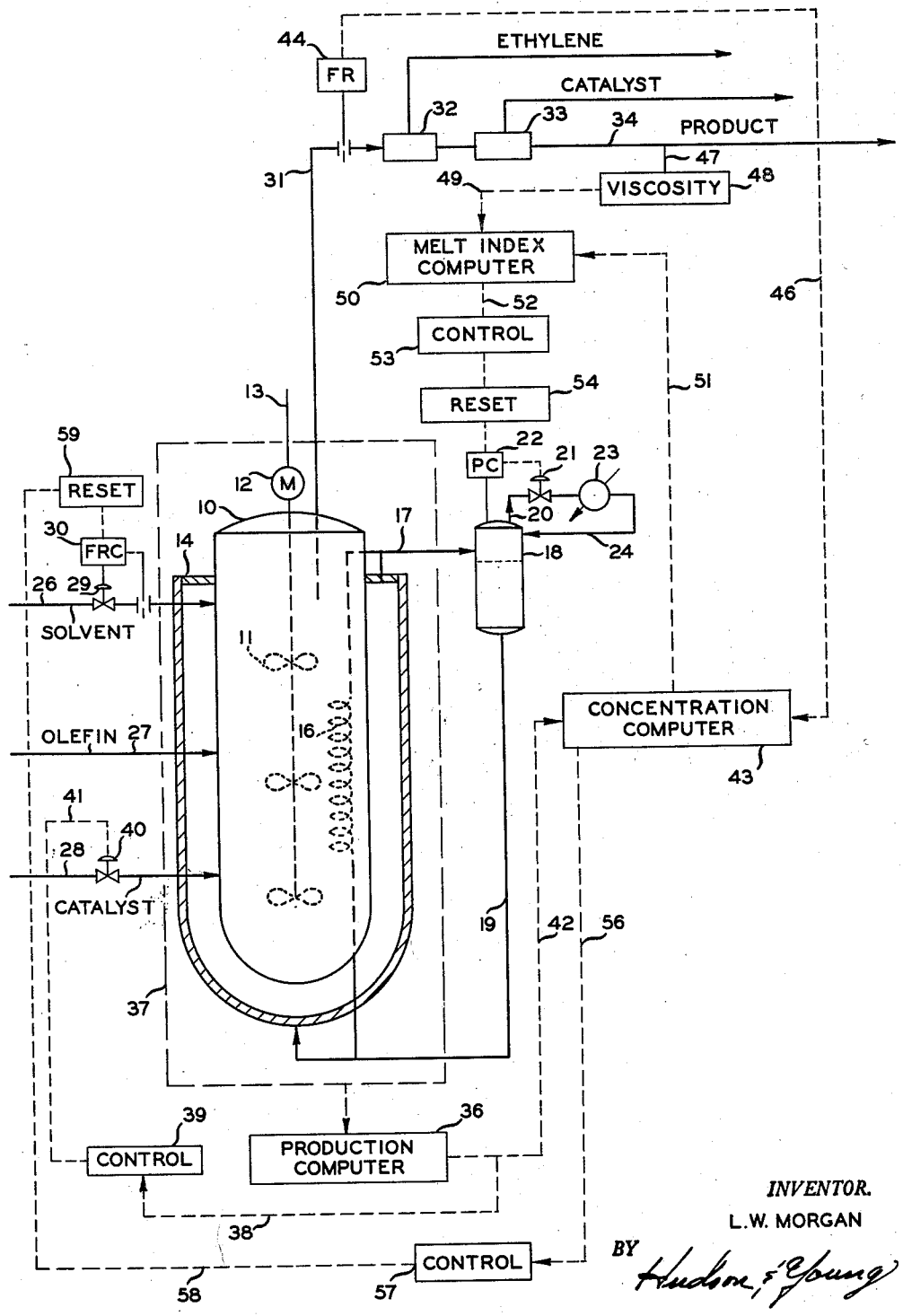
INVENTOR.
L.W. MORGAN
BY
*Hudson & Young*
ATTORNEYS

United States Patent Office 3,108,094
Patented Oct. 22, 1963

3,108,094
OLEFIN POLYMERIZATION
Lyman W. Morgan, Golden, Colo., assignor to Phillips
Petroleum Company, a corporation of Delaware
Filed May 18, 1959, Ser. No. 813,991
11 Claims. (Cl. 260—94.9)

This invention relates to olefin polymerization. In another aspect it relates to a method and apparatus for controlling reaction conditions of an olefin polymerization.

Various methods are known for producing normally solid and semisolid polymers. Recently considerable attention has been directed toward the production of solid olefin polymers such as polyethylene and polypropylene. These polymerizations are frequently carried out in the presence of a solid catalyst utilizing a liquid solvent as the reaction medium. The reactions also are normally exothermic so that it is necessary to provide means for removing the heat of reaction. Polymer characteristics are affected by conditions of temperature, polymerization rate, polymer concentration and residence time of materials in the reactor since these conditions bear a significant part in determining the average molecular weight and/or molecular weight distribution of the polymer product. Polymer melt index, which is a property very important to fabricators, is affected to a considerable extent by relatively few high molecular weight molecules which tend to form mainly on the reactor cooling surfaces. It is with the more accurate and reliable control of such polymerization reactions that this invention is concerned.

According to my invention there is provided a method for controlling a continuous polymerization reaction for the production of solid olefin polymers of uniform quality wherein olefin, solvent and catalyst are continuously fed to a reaction zone from which the heat of reaction is removed and the reactor effluent is withdrawn containing normally solid polymer in solution. Improved control of such a polymerization reaction is provided by varying the catalyst feed rate in response to and inversely proportional to changes in polymer production rate within the reactor and varying the solvent feed rate in response to and directly proportional to changes in polymer concentration in the effluent stream. Further and more complete control of polymer quality is obtained by establishing a first output potential representative of polymer concentration, establishing a second output potential representative of the viscosity of the polymer solution in the effluent stream at a given temperature and in response to said first and second potentials, establishing a third output potential which is representative of polymer melt index and varying the temperature of the coolant employed to remove heat from the reactor in response to and inversely proportional to changes in polymer melt index. By "potential" I intend to include mechanical, hydraulic and pneumatic potentials as well as electrical voltages. The apparatus employed according to my invention includes in addition to the basic reactor system with means for feeding materials to the reactor, and means for withdrawing an effluent stream and means for removing reaction heat from the reactor, in combination, computing means for establishing an output potential representative of polymer production rate and an output potential representative of polymer concenration, computing means to establish an output representative of polymer melt index, means for measuring viscosity of the polymer solution in the effluent stream and producing an output representative thereof, means for applying the viscosity and concentration output to said means for computing melt index, and means for applying the output of the melt index computing means to means for controlling the temperature of the reactor cooling fluid. Another embodiment of my invention also includes means for controlling the catalyst feed rate in response to the output representative of production rate and means for controlling solvent feed in response to the output representative of concentration. Another object is to provide method and means for maintaining substantially constant polymerization reactor residence time. Still another object is to obtain uniform physical properties of normally solid olefin polymer and especially to obtain substantially constant melt index of the polymer product. Other objects, advantages and features of my invention will be apparent from the following discussion and drawing which depicts schematically the reactor and control features of my invention.

While the present invention is applicable broadly to olefin polymerization processes in general, it is of particular importance in polymerization of olefins employing a normally solid catalyst and liquid solvent for the polymer such as is disclosed in the patent to Hogan et al., U.S. 2,825,721, issued March 4, 1958. This olefin polymerization process can be used to produce a wide variety of polymers such as polymers or copolymers of monoolefins, such as ethylene, propylene, butylene, and the like, and also copolymers of monoolefins and diolefins, such as butadiene, isoprene and the like. Preferably the olefin feed for the polymerization comprises at least one olefin selected from the class of 1-olefins having a maximum of 8 carbon atoms per molecule and no branching nearer the double bond than the 4 position. The polymerization temperature is generally in the range of 150 to 450° F. and the pressure is in the range from about atmospheric to as high as 1000 p.s.i.a., preferably about 100 to 700 p.s.i.a.

The catalyst employed according to the preferred process disclosed in the Hogan et al. patent is a solid catalyst comprising as an essential ingredient chromium oxide, preferably including a substantial amount of hexavalent chromium and ordinarily associated with at least one other oxide, particularly those selected from the group consisting of silica, alumina, zirconia and thoria. Various organometallic compounds, such as triethylaluminum plus titanium tetrachloride, mixtures of ethylaluminum halide with titanium tetrachloride and the like may also be used as catalyst systems in preparing normally solid polymers of mono-1-olefins. Still another group of catalysts which are suitable comprise a halide of a Group IV metal such as, for example, titanium tetrachloride, zirconium tetrachloride or the like, with one or more free metals selected from the group consisting of sodium, potassium, lithium, rubidium, zinc, cadmium and aluminum.

Suitable solvents for use in the above-described process are hydrocarbons which are liquid and chemically inert under the reaction conditions. Such solvents include paraffins having 3 to 12 and preferably 6 to 9 carbon atoms per molecule and naphthenic hydrocarbons having 5 to 6 carbon atoms in a naphthene ring. Examples of such solvents are isooctane, n-hexane, n-decane, methylcyclohexane, cyclohexane, methylpropylcyclohexane, and the like.

The polymerization reaction being exothermic requires effective measures for removing the heat of reaction. Generally the reactor is equipped with efficient agitation means so that conditions of temperature and reactant concentration are uniform throughout the reactor. The reactor is also usually equipped with a jacket and cooling coils through which a heat exchange medium is circulated. A preferred heat exchange medium is solvent identical to that employed as the reaction medium so that if leaks occur no contamination problem is encountered. Preferably the coolant is maintained at such a pressure that it will boil at the temperature at which heat exchange takes place in the coils and jacket of the reactor. In this way uniform temperature is maintained throughout the length of the heat exchange coils and polymer properties are thereby more predictable. When a boiling coolant is employed in this manner the temperature of the coolant can be conveniently controlled by varying the pressure on the coolant, that is, by increasing the pressure in the coolant flash zone the temperature of the coolant is increased and by decreasing the pressure the temperature of the coolant is decreased.

There is considerable heat of reaction from the polymerization and the production rate of polymer bears a direct relationship to the heat of reaction; therefore, the rate of production can be conveniently measured by calculating a heat balance around the reactor. Such a heat balance can be computed continuously and automatically by equipment disclosed in my copending application, Serial No. 697,997, filed November 21, 1957, entitled, "Measurement of Polymerization Reactions" (now Patent No. 2,974,017). Production rates can also be computed from a monomer balance around the reactor. For example, when ethylene is being polymerized to produce polyethylene the rate of olefin added can be metered and the unreacted olefin which is flashed from the reactor effluent can be measured with an ethylene analyzer. An ethylene analyzer which is suitable for this purpose is described in U.S. Patent 2,579,825 issued to J. W. Hutchins, December 25, 1951. Other instruments such as an infrared analyzer, mass spectrometer or the like can be adapted to analyze for any of the polymerizable monomers which are within the scope of this invention.

For further description of my invention reference is now made to the attached drawing which shows schematically a reactor 10 which is equipped with agitator 11 driven by motor 12 connected by conduit 13 to a power source not shown. The reactor is also equipped with a jacket 14 and cooling coils 16. The jacket and cooling coils are part of a coolant circulation system which includes conduit 17 through which coolant from the coils and jacket passes to flash vessel 18, and line 19 which returns condensed coolant to the coils and jacket. In the cooling system illustrated a boiling coolant, such as isooctane, is employed and the pressure in tank 18 is regulated so that the coolant in the coils and jacket is vaporizing and removing heat of reaction from the reactor at a constant temperature. The mixture of coolant vapors and fluid passes through line 17 into tank 18 and vapors pass overhead through line 20 as controlled by motor valve 21 which is operatively connected to pressure controller 22 sensing the pressure in tank 18 and controlling the rate at which vapors pass through line 20 accordingly. Vapors are condensed in heat exchanger 23 and the condensate is returned to tank 18 through line 24. In the system illustrated the cooling capacity of exchanger 23 exceeds the maximum required for normal operation so that the pressure in tank 18 can be controlled readily by varying the rate of flow of vapors through line 20. Alternatively the pressure in tank 18 could be controlled by varying the coolant rate through condenser 23.

Reactor 10 is also equipped with conduit means 26 feeding solvent to the reactor, conduit 27 feeding olefin and conduit 28 feeding catalyst. The catalyst can be mixed with a small amount of the solvent and introduced in the form of a slurry. The solvent rate of introduction is controlled at a substantially constant value by motor valve 29 which is operatively connected to flow recorder controller 30 sensing the rate of flow of solvent through line 26. Reactor effluent is withdrawn through line 31, passes through monomer flash removal zone 32 and thence through catalyst removal zone 33 employing solid-liquid separation methods such as filtration or centrifugation. The remaining fluid is primarily a solution of the polymer product in the solvent employed as reaction medium and passes to further recovery steps through line 34.

The control system of my invention employs as a basic unit thereof a production computer 36 which is adapted to receive output potentials representative of the quantities of heat introduced and removed from the reactor and thereby compute through a conventional heat balance the rate of polymer produced within the reactor. The details of the circuits and connections which make up such a computer are not part of this invention but are disclosed and claimed along with the details of the concentration computer in my copending application, Serial No. 697,997 above-mentioned. The heat of reaction is sensed by the suitable temperature and flow measuring devices represented in this drawing by dotted line 37 intersecting all of the avenues of heat introduction and removal except, of course, the heat generated as a result of the polymerization reaction itself. The difference between the heat lost and removed and that introduced in streams entering the reactor and by mechanical work done on the reaction mass by the agitator is the heat of reaction. Computer 36 establishes an output potential which is representative of the rate at which this heat of reaction is generated which in turn is representative of the rate of polymer production. This output potential is applied through conduit 38 to controller 39 which is an instrument such as a transducer which converts the electrical potential received by it into mechanical, hydraulic, or pneumatic movement which is applied to motor control valve 40 through line 41. Valve 40 in line 28 controls the rate at which catalyst is introduced to the polymerization reactor and the assembly shown enables control of catalyst feed rate in response to polymer production rate within the reactor. Should catalyst activity decline, production rate would likewise tend to decline so that a change in production rate would be indicated by a reduced output potential of computer 36 which in turn affects the setting of valve 40 so that an increased quantity of catalyst is introduced to the reactor returning the production rate to its normal desirable value.

The output potential of computer 36 is also applied through line 42 to concentration computer 43. Computer 43 also receives a signal from flow meter 44 through line 46. From the potentials received through lines 42 and 46 which are representative of polymer production rate and effluent flow rate, respectively, the concentration of polymer in the reactor, which is the same as that in the effluent stream, can be computed. The details of this computer are disclosed and claimed in my above-mentioned copending application, Serial No. 697,997 and since they do not represent a novel feature of my present invention such details are not included here. The computer disclosed in this copending application is a combination of production and concentration computers 36 and 43 as shown in the attached drawing. For purposes of simplicity, however, in the present invention these units have been illustrated as separate computers since the outputs therefrom are employed separately to control different variables of the reaction.

The polymer effluent from which ethylene and catalyst have been removed is sampled and the sample is passed through line 47 to viscosimeter 48. This viscosimeter can be any well-known commercially available type suitable for measuring the viscosity of a solution such as, for example, a Fisher-Porter Automatic Electrical Impulse Viscosimeter (Fisher-Porter Catalog 88B, pages 8801–8804). A rotational viscosimeter such as described in U.S. Patent 2,713,790 issued July 26, 1955, to E. M. Barber et al. is preferred.

The viscosimeter 48 measures the viscosity of the polymer solution at a constant temperature and produces an output potential which is representative of the viscosity of the polymer solution in the reactor effluent. This potential is applied through conduit 49 to melt index computer 50. An output potential representative of the concentration of polymer in solution is established by concentration computer 43 and this potential is applied to computer 50 through line 51. Computer 50 is a standard electronic analog computer which produces an output voltage that is an arbitrary function of two independent input voltages. Such a computer is marketed by George A. Philbrick, Researches Incorporated, 230 Congress Street, Boston, Mass., and is described in detail in this company's brochure as Model F2V Computer. Computer 50 produces an output potential which is representative of the melt index of the polymer being made in reactor 10 and this potential is applied through conduit 52, through controller 53, which converts the potential of computer 50 into a mechanical, hydraulic or pneumatic signal, to reset 54 serving to reset pressure controller 22 so that the temperature of the boiling coolant can be regulated to give the desired melt index of the polymer product. The output potential of concentration computer 43 is also applied through line 56 to controller 57 which, when concentration leaves a given range, sends a signal through line 58 to reset 59 which establishes a new set point for flow controller 30. The addition of solvent to the reactor is thereby changed so that polymer concentration returns to normal. Controller 57, reset 59 and controller 30 can be one instrument.

Melt index computer 50 can be calibrated on stream. An excellent correlation exists between solution viscosity, polymer concentration and polymer melt index of these normally solid olefin polymers. For example, a correlation equation for both the ethylene homopolymer and the ethylenebutene-1 copolymer is as follows:

$$\mu = 20150 \frac{P^{3.00}}{M^{0.62}T^{2.09}}$$

where $\mu$ = solution viscosity in centipoises
$P$ = polymer concentration in weight percent
$M$ = polymer melt index
$T$ = temperature, °F.

The correlation coefficient for this equation is 0.9886 with 1.000 as perfect. The viscosity for use in this equation should be determined with shear rates in the range of from 3 to 138 reciprocal seconds.

Melt index is defined as the grams of polymer extruded in 10 minutes through a 0.0825 inch orifice at 190° C. when subjected to a load of 2160 grams. A dead weight piston plastometer manufactured by the F. F. Slocomb Corporation is used for this test.

The ASTM-D-1238 procedure is used except that for a melt index range of 0–1, five 2-minute extruded samples are taken, weighed when cool and the averaged weight multiplied by 5. For a melt index range of 1–10, five 1-minute extrudate samples are weighed and the average multiplied by 10. For a melt index range of 10–80, a 325 gram weight is used, five 1-minute extrudate samples are weighed, the average multiplied by 10 to arrive at a flow rate (F) which is converted to melt index (MI) by the formula:

Log MI = 0.92 Log F + 1.039

As an example of the manner in which my invention serves to provide more uniform polymer quality the following specific conditions are presented.

*Example*

Ethylene, cyclohexane and chromium oxide catalyst slurried in cyclohexane are introduced to reactor 10 through conduits 27, 26 and 28, respectively. The catalyst comprises 2.5 weight percent chromium oxide containing 2.2 percent hexavalent chromium supported on silica-alumina. The catalyst was prepared by impregnating 20 to 60 mesh 90/10 silica-alumina with 0.76 molar chromium dioxide solution followed by drying and activation with dry air for 6 hours at 950° F. During normal operation these streams are controlled to provide an ethylene feed rate of about 8200 lb./hr., a solvent feed rate of about 8000 lb./hr., and a catalyst slurry feed rate of about 2300 lb./hr., said slurry having a liquid (solvent) to solid ratio of about 10 to 1. Within the reactor there is maintained by agitation a homogeneous suspension of catalyst in liquid. The ethylene polymerizes to form solid polymer, the reaction being carried out at about 290° F. and pressure of about 500 p.s.i.a. About 90 percent of the ethylene is consumed in the polymerization reaction. The reactor effluent is continuously removed and flashed to remove unreacted ethylene and filtered to remove catalyst from the polymer solution which contains about 9.0 weight percent polymer. The temperature of the reaction is maintained substantially constant by circulation of cyclohexane through the cooling coils and jacket of the reactor at a pressure such that the cyclohexane is boiling.

A continuous heat balance computed around the reactor provides an output signal from computer 36 which represents the rate of polymer production. The polymer production rate is controlled at a preselected value by varying the rate of catalyst introduction into the reactor. If because of the change of some variable such as catalyst activity the production rate tends to increase, control signal from computer 36 transmitted through controller 39 tends to close valve 40 reducing the flow of catalyst into the reactor. This alteration in catalyst flow to the reactor causes the rate of production to return to a normal desired value. Conversely, if the production rate tends to decrease the heat of reaction likewise tends to decrease and the control system shown increases the supply of catalyst to the reactor so that the total production rate returns to normal.

The flow of solvent to the reactor is maintained substantially constant by flow controller 30 and the flow of reactor effluent is continuously metered by flow meter 44. Concentration computer 43 provides an output potential which is representative of concentration of polymer in solution in the reactor and this potential is applied through conduit 56 to controller 57 which adjusts reset 59 establishing a new set point when necessary for flow controller 30. If the temperature of solvent in line 26 decreases, the density of the solvent increases and hence at any given setting of motor valve 29 the weight of solvent admitted to the reactor at any given setting of motor valve 29 will increase and the concentration of polymer in the reactor will be correspondingly decreased. In response to this change an adjustment is made through reset 59 to establish a new set point for controller 30 so that volume flow of solvent through line 26 is decreased and the polymer concentration is maintained at the desired 9.0 weight percent. Since production rate is held constant this also assures that reactor residence time remains substantially constant.

Through the combination of viscosity measurements and concentration measurements, melt index computer 50 controls the pressure in flash tank 18 so that the boiling coolant temperature in combination with the controlled production rate and reactor residence time provides a polymer product of a given melt index. Should the melt index tend to increase indicating a reduction in the amount of higher molecular weight component of the polymer, pressure controller 22 is reset to maintain a lower pressure and a correspondingly lower temperature for the boiling coolant. Since the higher molecular molecules tend to be formed at the cooling surfaces, a slight change in the temperature of the boiling coolant can affect the melt index of the polymer. At a lower temperature of the boiling coolant, more of the higher molecular weight molecules tend to form thereby reducing the melt index of the product. Should the melt index become too low then the temperature of the boiling coolant is increased slightly so that the number of high molecular weight molecules are reduced and the melt index is returned to its desired value. It can be seen therefore, that an accurate and sensitive control is provided by my invention to provide a continuous process for producing an olefin polymer having constant and uniform properties.

As will be evident to those skilled in the art, various modifications of this invention can be made or followed in the light of the foregoing disclosure and discussion without departing from the spirit and scope of the disclosure or from the scope of the claims.

I claim:

1. A method of controlling a continuous polymerization reaction for production of solid olefin polymer of uniform quality wherein olefin, solvent and catalyst are continuously fed to a reaction zone from which heat of reaction is removed and the reactor effluent contains polymer in solution which comprises measuring the rate of olefin polymerization, producing a first control output proportional to said rate of polymerization, measuring the flow rate of said reactor effluent, producing a second control output proportional to said flow rate, producing a third control output proportional to polymer concentration in said effluent in response to said first and second outputs, varying the rate of catalyst feed to said zone in response to and inversely proportional to said first output to maintain a substantially constant rate of polymerization and varying the rate of solvent feed to said zone in response to and directly proportional to said third output to maintain a substantially constant polymer concentration in said effluent.

2. The method of claim 1 wherein said rate of olefin polymerization is measured by measuring the heat generated by said reaction.

3. The method of claim 1 wherein said rate of olefin polymerization is measured by measuring the olefin consumed by said reaction.

4. A method for controlling a continuous polymerization reaction for production of solid olefin polymer of uniform quality wherein olefin, solvent and catalyst are continuously fed to a reaction zone from which heat of reaction is removed by indirect heat exchange with a coolant and the reactor effluent contains polymer in solution plus unreacted olefin and catalyst, which comprises, measuring the rate of olefin polymerization, producing a first control output proportional to said rate of polymerization, measuring the flow rate of said reactor effluent, producing a second control output proportional to said flow rate, producing a third control output proportional to polymer concentration in said effluent in response to said first and second outputs, separating unreacted olefin and catalyst from said effluent, measuring the viscosity of said polymer in solution in said effluent at a constant temperature, producing a fourth control output proportional to said viscosity, producing a fifth control output proportional to polymer melt index in response to said third and fourth outputs, and varying the temperature of said coolant in response to and inversely proportional to said fifth output to maintain polymer melt index at a substantially constant value.

5. The method of claim 4 wherein a boiling coolant is used to remove heat from the reaction zone and coolant temperature is varied by changing the coolant flash pressure.

6. A method for controlling a continuous polymerization reaction for production of normally solid mono-1-olefin polymer of uniform quality wherein olefin, solvent, and catalyst are continuously fed to an agitated reaction zone, heat is continuously removed from said zone by indirect heat exchange with a boiling coolant to maintain the reaction temperature substantially constant, and the reactor effluent is continuously processed to remove unreacted olefin and catalyst from the solution of polymer in solvent, which comprises measuring the polymer production rate in said zone as indicated by a heat balance around said zone, producing a first control output proportional to said polymer production rate, varying the rate of catalyst addition to said zone in response to and inversely proportional to said first output to maintain a substantially constant polymerization rate, measuring the rate of flow of effluent from said zone, producing a second control output proportional to said rate of flow, producing a third control output proportional to polymer concentration in said effluent in response to said first and second outputs, varying the rate of solvent addition to said zone in response to and directly proportional to said third output to maintain the polymer concentration in said effluent substantially constant, measuring the viscosity of the polymer solution from said effluent at a constant temperature, producing a fourth control output proportional to said viscosity, producing a fifth control output proportional to polymer melt index in response to said third and fourth outputs, and varying the temperature of said boiling coolant by changing the pressure thereon in response to and inversely proportional to said fifth output to maintain said melt index substantially constant.

7. The method of claim 6 wherein said mono-1-olefin polymer is an ethylene polymer and said fifth control output is produced according to the relationship $$\mu = 20150 \frac{P^{3.00}}{M^{0.02} T^{2.05}}$$

where $\mu$ = solution viscosity in centipoises
$P$ = polymer concentration in weight percent
$M$ = polymer melt index
$T$ = temperature of viscosity measurement, °F.

8. In apparatus suitable for carrying out the polymerization of an olefin to a solid polymer including a reactor adapted to carry out said polymerization reaction, indirect heat exchange means utilizing a cooling fluid for cooling the reactor, means for introducing catalyst, solvent, and olefin to said reactor, and means for removing from said reactor an effluent stream containing polymer product in solution, the improvement which comprises, in combination, means for controlling solvent feed rate responsive to and directly proportional to changes in polymer concentration in the effluent stream, and means for controlling the temperature of said cooling fluid responsive to and inversely proportional to changes in polymer melt index.

9. In apparatus suitable for carrying out the polymerization of an olefin to a solid polymer including a reactor adapted to carry out said polymerization reaction, indirect heat exchange means utilizing a cooling fluid for cooling the reactor, means for introducing catalyst, solvent, and olefin to said reactor, and means for removing from said reactor an effluent stream containing polymer product in solution, the improvement which comprises, in combination, means for controlling solvent feed rate responsive to and directly proportional to changes in polymer concentration in the effluent stream, means for controlling catalyst feed rate responsive to and inversely proportional to changes in polymer production rate in said reactor and means for controlling the temperature of said cooling fluid responsive to and inversely proportional to changes in polymer melt index.

10. In apparatus suitable for carrying out the polymerization of ethylene to a solid polymer including a reactor provided with a jacket, coils and agitation means, means for circulating a boiling coolant through said jacket and coils, means for introducing catalyst, solvent, and ethylene to said reactor, means for removing from said reactor an effluent stream containing polymer in solution, catalyst and ethylene, and means for separating said catalyst and ethylene from said polymer solution, the improvement comprising, in combination, first computing means to establish a first output potential representative of the polymer production rate in said reactor, means for controlling the catalyst feed rate responsive to and inversely proportional to said first output potential, means to establish a second potential representative of the rate of withdrawal of effluent stream from said reactor, second computing means to establish a third output potential representative of polymer concentration in said reactor, means for applying said first and second potentials to said second computing means, means to establish a fourth potential representative of the viscosity of said polymer solution at a given temperature, third computing means to establish a fifth output potential representative of polymer melt index, means for applying said third and fourth potentials to said third computing means, and means for controlling the pressure on said boiling coolant responsive to and inversely proportional to said fifth output potential.

11. A method for controlling a continuous polymerization reaction for production of solid olefin polymer of uniform quality wherein olefin, solvent and catalyst are continuously fed to a reaction zone from which heat of reaction is removed by indirect heat exchange with a coolant and the reactor effluent contains polymer in solution, which comprises, controlling solvent feed rate responsive to and directly proportional to changes in polymer concentration in said effluent, and controlling the temperature of said coolant responsive to and inversely proportional to changes in polymer melt index.

References Cited in the file of this patent

UNITED STATES PATENTS

| | | |
|---|---|---|
| 2,440,882 | Hachmuth | May 4, 1948 |
| 2,825,721 | Hogan et al. | Mar. 4, 1958 |
| 2,863,737 | Green | Dec. 9, 1958 |
| 2,886,616 | Mertz et al. | May 12, 1959 |
| 2,897,247 | Marak | July 28, 1959 |
| 2,908,734 | Cottle | Oct. 13, 1959 |